July 2, 1957     E. J. SCHLOTTHAUER ET AL     2,797,956
SIDE BOARD LIFTER

Filed Oct. 28, 1955     2 Sheets-Sheet 1

INVENTOR.
HENRY SCHLOTTHAUER
EDWARD J. SCHLOTTHAUER
BY McMorrow, Berman & Davidson
ATTORNEYS July 2, 1957   E. J. SCHLOTTHAUER ET AL   2,797,956
SIDE BOARD LIFTER
Filed Oct. 28, 1955   2 Sheets-Sheet 2
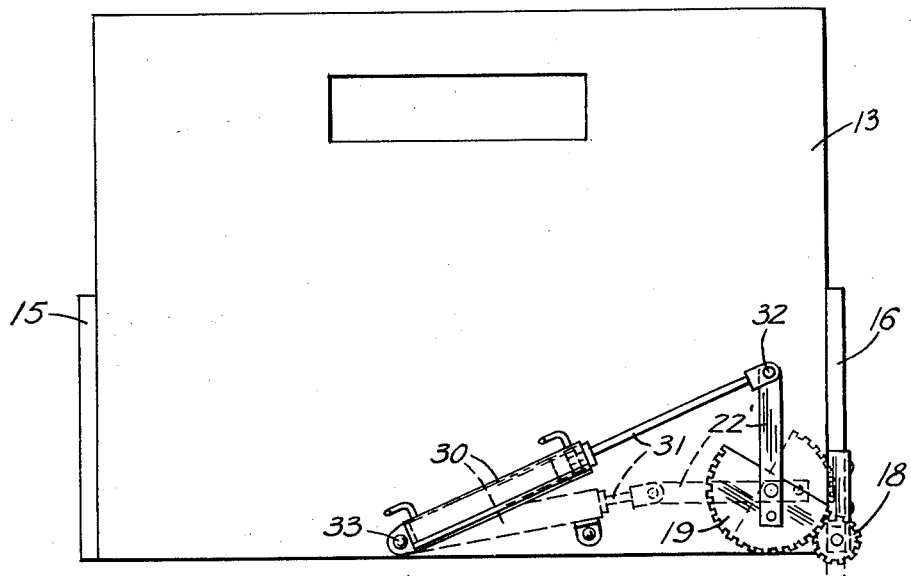
FIG. 5
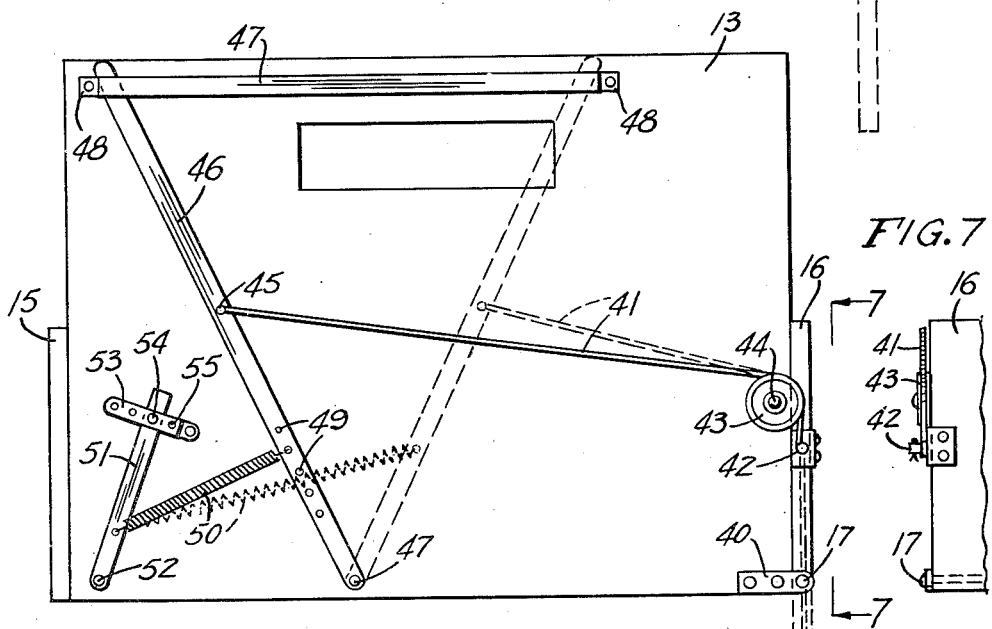
FIG. 6
FIG. 7
INVENTOR.
HENRY SCHLOTTHAUER
EDWARD J. SCHLOTTHAUER
BY
McMorrow, Berman & Davidson
ATTORNEYS United States Patent Office 2,797,956
Patented July 2, 1957

2,797,956

SIDE BOARD LIFTER

Edward J. Schlotthauer, Gering, Nebr., and Henry Schlotthauer, Fort Collins, Colo.

Application October 28, 1955, Serial No. 543,406

3 Claims. (Cl. 296—36)

This invention relates to improvements in vehicles, and more particularly to an improved gate board operating means for a vehicle employed to haul harvested material, such as sugar beets, or the like.

A main object of the invention is to provide a novel and improved gate operating means for use in operating the side board of a vehicle employed for hauling sugar beets and similar harvested material, the improved operating mechanism involving simple components, being easy to install, and providing a great saving in the labor required to open and close the side board of the vehicle on which it is employed.

A further object of the invention is to provide an improved swingable side board structure for a truck or similar vehicle employed to haul farm crops, such as sugar beets, or the like, the improved side board structure involving inexpensive parts, being rugged in construction, and being arranged so that the side board may be swung from open to closed positions, or vice versa, by a single person in an easy and rapid manner.

Further objects and advantages of the invention will become apparent from the following description and claims, and from the accompanying drawings, wherein:

Figure 5 is an end view of a vehicle provided with a modified form of side board operating mechanism according to this invention.

Figure 6 is an end view of a vehicle provided with a still further modified form of side board operating mechanism according to the present invention.

Figure 7 is a fragmentary elevational view taken on line 7—7 of Figure 6.

Figure 1:
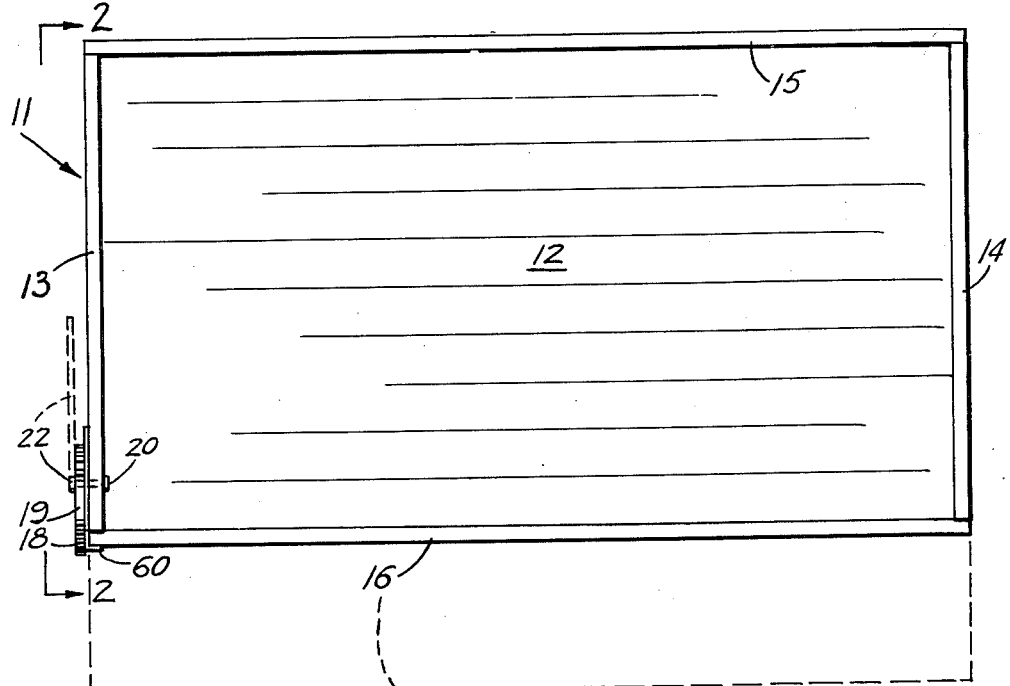
Figure 1 is a top view of the bed of a vehicle employed to haul harvested crops, such as sugar beets, or the like, provided with an improved swingable side board and operating mechanism therefor, constructed in accordance with the present invention.

Referring to the drawings, and more particularly to Figures 1 to 4, 11 designates a farm vehicle having a generally rectangular bottom or bed 12, having the respective vertical end walls 13 and 14, having the rigid longitudinal side wall 15, and having the hinged longitudinal gate board 16.

Figure 2:
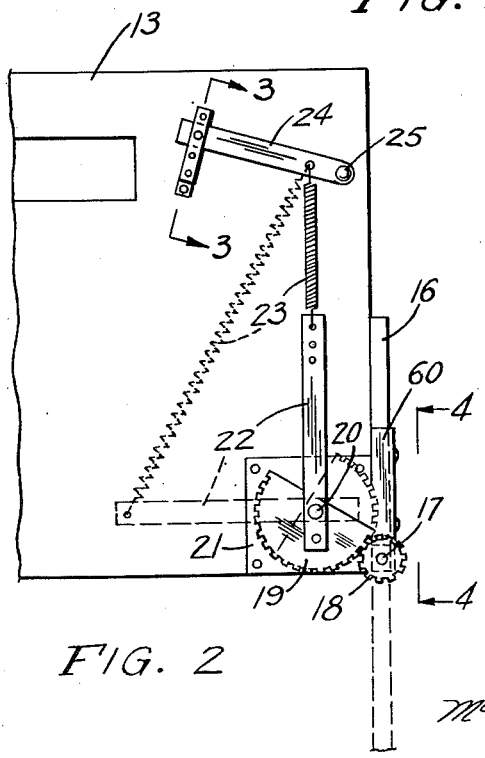
Figure 2 is a fragmentary side elevational view of a portion of the end wall of the vehicle of Figure 1, showing the side board operating mechanism.

The gate board 16 is hinged on a longitudinal axis, for example, on hinge pins 17, so that the board 16 is swingable from the closed full line position thereof, shown in Figure 2, to the open, depending, dotted view position shown in said figure.

Rigidly secured to the hinge pin 17, and being therefore rigid with the gate board 16, is a relatively small gear 18. Designated at 19 is a relatively large gear member which is pivoted at 20 to a plate 21 rigidly secured to the end wall 13, the large gear 19 meshing with the small gear 18, as shown in Figure 2.

Figure 3:
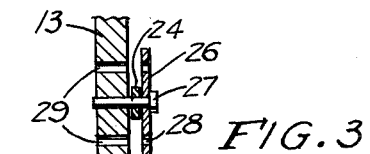
Figure 3 is an enlarged cross sectional detail view taken on line 3—3 of Figure 2.
Figure 4:
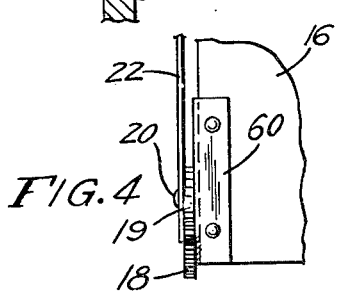
Figure 4 is an enlarged fragmentary elevational view taken on line 4—4 of Figure 2.

As shown, the gear member 19 may merely comprise a segment slightly greater than semi-circular in shape. Rigidly secured to gear member 19 is an arm 22 which extends upwardly, as shown in Figure 2, and which has its end connected by a coil spring 23 to a tensioning arm 24 pivoted at 25 to the wall 13 above the arm 22. The arm 24 extends between an offset bracket bar 26 and the wall 13, as shown in Figure 3, and is adjustably secured to provide a desired tension on the spring 23 by means of a pin 27 extending through one of a number of spaced apertures 28 provided in the offset bar 26 and corresponding apertures 29 provided in the wall 13. The tensioning arm 24 is apertured to receive the pin 27, whereby the tensioning arm 24 may be held in a desired position of adjustment by pin 27, said pin being engaged through a pair of registering apparatus 28 and 29.

In operating the gate board 16, it is merely necessary to manually rotate the arm 22, for example, to rotate the arm 22 from its upright full line position in Figure 2 to its horizontal dotted view position in said figure, whereby the large gear 19 causes the small gear 18 to rotate through one half of a revolution, swinging the gate board 16 from its upright vertical position to its depending vertical position, shown in dotted view in Figure 2. This operation requires very little manual effort, since the weight of the gate board 16 and the force of the material in the truck bed acts, along with the force placed on the arm 22 by the operator, to overcome the resistance of the coil spring 23, said coil spring therefore acting as a counterbalance means. Conversely, the gate board 16 may be elevated from its depending open position to its closed position, shown in Figure 2, by allowing spring 23 to elevate the arm 22.

In the modification illustrated in Figure 5, the gate board 16 is operated by a hydraulic cylinder 30 whose extensible piston element 31 is pivotally connected at 32 to the end of the gate board operating arm, shown at 22', said arm 22' being rigidly connected with the large gear member 19. As will be readily apparent from Figure 5, when the piston rod element 31 of the hydraulic cylinder 30 is retracted, the arm 22' is rotated counterclockwise, as viewed in Figure 5, with the large gear 19, causing the small gear 18 to be rotated clockwise, and causing the gate board 16 to be swung from its closed vertical position to its open depending position, shown in dotted view in Figure 5. The cylinder 30 is pivoted at 33 to the end wall 13 of the vehicle, so that the cylinder may swing freely in accordance with the movements of the piston rod element 31 and arm 22', for example, may rotate to the dotted view position thereof shown in Figure 5, in which position the arm 22' is substantially horizontal and the gate board 16 is in its depending open position. To rotate the gate board 16, from its open, dotted view position of Figure 5 to its full line closed position, the piston rod element 31 is extended, whereby the gate board is rotated counterclockwise, from its dotted view position, to its full line, closed position in Figure 5, and whereby the arm 22' is rotated clockwise, as viewed in Figure 5, from the dotted view, substantially horizontal position therein shown to the substantially vertical position, shown in full line view in Figure 5.

In the form of the invention shown in Figures 6 and 7, the gate board 16 is hinged to the vehicle by pins 17 extending through brackets 40 secured to the lower corner portions of the end walls of the vehicle, and the end of the flexible member, such as a chain or cable 41 is connected at 42 to the intermediate portion of the side edge of the gate board 16. The flexible chain or cable 41 passes over a suitable pulley 43 journaled at 44 to the end wall 13 over the bracket element 40 secured to the lower corner portion of said end wall, the flexible chain or cable 41 being connected at 45 to the intermediate portion of an operating arm 46 pivoted at 47 to the wall 13. The top end of the operating arm 46 is slidably received behind a bracket bar 47 secured parallel to the upper portion of wall 13, as shown in Figure 6, as by the end legs 48, 48 provided on the bracket bar 47. The lower portion of the arm 46 is provided with spaced apertures 49, and the end of a coil spring 50 is connected to the arm 46 at a selected aperture 49, the other end of the spring being connected to a tensioning arm 51 pivoted at 52 to the wall 13, the arm 51 extending upwardly and being received between an offset bracket bar 53 and the wall 13. The arm 51 may be secured in a desired position of angular adjustment, providing a desired amount of tension in the spring by means of a fastening pin 54 engaged through a selected aperture 55 in the offset member 53 and extending through an aperture in the arm 51 into a corresponding aperture in the wall 13 registering with the selected aperture 55.

When the operating arm 46 is manually swung from its full line position in Figure 6 to its dotted view position, the gate board 16 is allowed to swing downwardly from its vertical closed position, to its depending open position, the weight of the gate board 16 and the weight of the material in the vehicle acting against the tension of the spring 50, whereby only a small amount of manual force is required to swing the arm 46 clockwise from its full line position in Figure 6 to its dotted view position. To close the gate board, it is merely necessary to release the arm 46, whereby the spring 50, with possibly only a small amount of manual force, applied to arm 46, causes the gate board 16 to be elevated from its depending position to its full line closed position. Spring 50 thus serves to counterbalance the gate board and to provide a means whereby the gate board may be rotated by use of only a small amount of manual force applied to the operating arm 46.

In the forms of the invention shown in Figures 1 to 5, the small gear 18 may be rigidly secured to the gate board 16 coaxial with the hinge axis of said gate in any suitable manner. Thus, the small gear 18 may be rigidly secured, as by welding or the like, to an angle bar 60 which in turn is riveted, or otherwise rigidly fastened to the gate board 16, rigidly securing the small gear 18 in a position coaxial with the hinge axis of the gate board.

While certain specific embodiments of an improved gate board operating mechanism for a vehicle have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a vehicle of the character described, a rectangular bed, a first upstanding side wall secured to one side margin of the bed, upstanding end walls secured to the end margins of said bed, defining an enclosure open at the other side margin of the bed, a gate board hinged to said other side margin, a relatively small gear secured to an end of said gate board coaxially with the hinge axis of the board and adjacent one of said end walls, a relatively large gear rotatably mounted on said one of the end walls adjacent and meshing with said relatively small gear, and an actuating arm connected to said large gear, whereby said gate board is rotated responsive to rotation of said arm.

2. In a vehicle of the character described, a rectangular bed, upstanding end walls secured to the end margins of said bed, a first upstanding side wall secured to one side margin of the bed, defining an enclosure open at the other side margin of the bed, a gate board hinged to said other side margin, a relatively small gear secured to an end of said gate board coaxially with the hinge axis of the board and adjacent one of said end walls, a relatively large gear rotatably mounted on said one of the end walls adjacent and meshing with said relatively small gear, an actuating arm connected to said large gear, whereby said gate board is rotated responsive to rotation of said arm, and spring means connecting said arm to said last named wall and biasing said gate board to an upright closed position.

3. In a vehicle of the character described, a rectangular bed, upstanding end walls secured to the end margins of said bed, a first upstanding side wall secured to one side margin of the bed, defining an enclosure open at the other side margin of the bed, a gate board hinged to said other side margin, a relatively small gear secured to an end of said gate board coaxially with the hinge axis of the board and adjacent one of said end walls, a relatively large gear rotatably mounted on said one of the end walls adjacent and meshing with said relatively small gear, an actuating arm connected to said large gear, whereby said gate board is rotated responsive to rotation of said arm, a tensioning bar pivoted to said last named wall, means for securing said tensioning bar in an angularly adjusted position on said last named wall, and a coil spring connecting said tensioning bar to said actuating arm, biasing said gate board to an upright closed position.

References Cited in the file of this patent

UNITED STATES PATENTS

| 269,009 | Chapman | Dec. 12, 1882 |
| 402,932 | Jolly | May 7, 1889 |
| 1,403,037 | Knechtel | Jan. 10, 1922 |
| 2,151,335 | Rush | Mar. 21, 1939 |
| 2,668,703 | Haffey | Feb. 9, 1954 |

FOREIGN PATENTS

| 337,507 | France | Feb. 22, 1904 |